United States Patent [19]

Stocks

[11] 4,456,043
[45] Jun. 26, 1984

[54] WORK CLAMP AND TOOL GUIDE ASSEMBLY

[76] Inventor: David L. Stocks, 32221 Alipaz St., San Juan Capistrano, Calif. 92675

[21] Appl. No.: 544,823

[22] Filed: Oct. 24, 1983

Related U.S. Application Data

[63] Continuation of Ser. No. 276,041, Jun. 22, 1981, abandoned.

[51] Int. Cl.³ .............................................. B23Q 3/00
[52] U.S. Cl. .................................. 144/136 C; 269/97; 269/221; 269/287; 269/291; 269/303
[58] Field of Search .................... 83/455, 743, 821; 144/136 C, 136 D; 100/289, 290; 269/219, 221, 243, 290, 291, 293, 303–305, 287, 127–129, 1–2, 91–93, 97–98, 152, 155

[56] References Cited

U.S. PATENT DOCUMENTS

| 671,529 | 4/1901 | Swift | 100/290 |
|---|---|---|---|
| 967,119 | 8/1910 | Farnham | 269/221 |
| 1,175,811 | 3/1916 | Ray | 269/303 |
| 2,392,549 | 1/1946 | Rice | 269/129 |
| 2,525,204 | 10/1950 | Calabro | 100/290 |
| 2,651,333 | 9/1953 | Spinney | 269/290 |
| 2,848,785 | 8/1958 | Bachli et al. | 269/129 |
| 2,935,314 | 5/1960 | Ford | 269/1 |
| 3,450,001 | 6/1969 | Fortune | 144/136 C |
| 3,982,740 | 9/1976 | Gutman | 269/155 |
| 4,065,114 | 12/1977 | Pennington | 269/2 |
| 4,075,920 | 2/1978 | Neal | 83/455 |
| 4,077,292 | 3/1978 | Cole | 83/455 |
| 4,128,118 | 12/1978 | Ede | 144/136 C |
| 4,215,731 | 8/1980 | Maynard | 144/136 C |
| 4,224,854 | 9/1980 | Malacheski et al. | 83/455 |
| 4,291,868 | 9/1981 | Giles | 269/152 |

*Primary Examiner*—Robert C. Watson
*Attorney, Agent, or Firm*—Robert E. Strauss

[57] ABSTRACT

There is disclosed a work clamp and tool guide assembly which comprises a base plate, a crossbar secured to, and extending transversely across, the undersurface of the base plate, first and second upright posts, one each at opposite ends of the crossbar, a guide rail with distal apertures received over the first and second upright posts and locks to fixedly secure the guide rail at preselected heights. The workpiece is clamped between the guide rail and the base plate and can be oriented for right angle cuts by a fence which extends along at least one side of the base plate. A work tool such as a router, saw and the like can be guided across the surface of the workpiece with its edge against the guide rail.

5 Claims, 3 Drawing Figures

WORK CLAMP AND TOOL GUIDE ASSEMBLY

This is a continuation of application Ser. No. 276,041 filed June 22, 1981, and now abandoned.

BACKGROUND OF THE INVENTION

1. Field of the Invention

This invention relates to a clamping and guide assembly particularly useful for securing workpieces and guiding hand tools.

2. Brief Statement of the Prior Art

It is often difficult to secure a workpiece when sawing, routing or otherwise treating the workpiece. In a typical workshop application, a wide variety of sizes and shapes of boards and construction projects is encountered. The workpiece can be a relatively small board or can be a large bulky box and it is often necessary to secure the workpiece and position a tool guide on the workpiece to guide a saw, router, grinder and the like. It is often necessary to change tools while working on a single piece or a multiple of pieces, e.g., to use a saw for cutoff work and a router for edging, panel raising, groving, rabbeting or dadoing.

Various devices have been suggested as jigs or clamps and these have been provided with various slider members which serve to guide a work tool. Thus U.S. Pat. No. 4,128,118 discloses a jig having a fence with a bridge and separate or individual clamps to secure a board to the assembly. The clamps of this device function independently of any tool guide and can accept workpieces of only limited thicknesses.

U.S. Pat. No. 4,215,731 discloses a router guide assembly with a clamp for securing a board. This assembly utilizes the guide rails which slideably receive a plate to which is fixedly secured a tool such as a router. This device can accommodate workpieces of limited thicknesses and the tools cannot be easily interchanged.

U.S. Pat. No. 4,062,390 also discloses a clamping device for securing a workpiece of limited thickness in association with a guide to which is fixedly secured a hand tool such as a router or saw. Another clamping device is shown in U.S. Pat. No. 3,450,001. This device, too, can only hold workpieces of very limited thicknesses and requires that the work tool be fixedly secured to a slider member. Thus, one cannot readily interchange the tools.

BRIEF STATEMENT OF THE INVENTION

This invention comprises a work clamp and tool guide assembly which accommodates small or large and very bulky workpieces. The assembly comprises a base plate to which is secured a crossbar that extends transversely across the undersurface of the base plate. The crossbar has, at each end, vise means whereby the crossbar can be fixedly secured across the undersurface of the base plate. The assembly includes two upright posts which are fixedly secure at opposite ends of the crossbar. A guide rail is slidably mounted on the upright posts, which are received in transverse through bores distally located on the guide rail so that the guide rail extends, coextensively, with the crossbar, across the upper surface of the base plate. Lock means are provided to operatively engage the upright posts and fixedly secure the guide rail at any desired vertical position thereon.

The assembly of the invention is used by positioning the workpiece on the base plate, preferably against a fence which extends along one side of the base plate, and clamping it thereto by lowering the guide rail onto the upper surface of the workpiece and locking the guide rail securely to the upright posts. The workpiece is located, relative to the guide rail so that the guide rail can serve as a straight edge guide for the work tool. For this purpose, spacers of varied width can be used to position the workpiece in the assembly. Perpendicular cuts are ensured by use of the fence that extends coextensively along one side of the base plate, perpendicular to the crossbar and guide rail assembly.

BRIEF DESCRIPTION OF THE DRAWINGS

The invention will be described with reference to the figures of which.

DESCRIPTION OF THE PREFERRED EMBODIMENT

Figure 1:
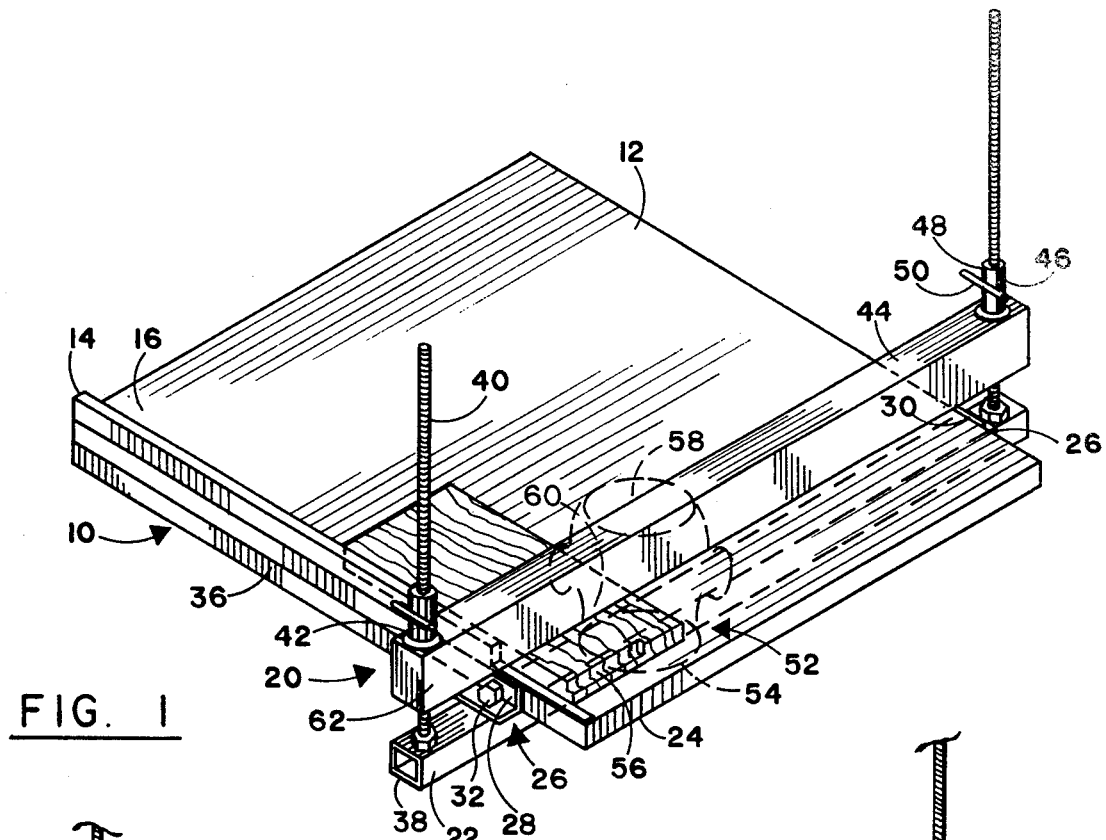
FIG. 1 is a perspective view of the assembly of the invention.

Referring now to FIG. 1, the assembly 10 comprises a base plate 12 having a fence 14 extending along at least one side 16 thereof for substantially the length of the base plate. A work clamp and tool guide assembly generally designated as 20 is secured to the forward portion of the base plate 12. This assembly 20 comprises a crossbar 22 that extends across the undersurface 24 of the base plate and that is secured thereto by vise means, generally designated as 26 and comprising a upright transverse flange 28 carried at one end of the crossbar 22 and a similar upright, transverse flange 30 carried at the opposite end of crossbar 22. One, or both of the upright flanges such as 28 can be provided with at least one, and preferably two, lead screws 32 and 34 that are threadably received in internally threaded apertures therein and that project into a clamping relationship to the edge 36 of the base plate 12.

The crossbar 22 extends outboard, past the edges of the base plate 12 for a short distance and the outboard ends such as 38 support an upright post such as 40. Each upright post is received in a transverse through bore such as 42 distally located on the clamp and tool guide bar 44. The guide bar extends substantially coextensively with crossbar 22 and is slideably mounted in the assembly on the upright posts 40. Clamp means generally designated at 46 can be provided to fixedly secure guide rail 44 to each of the upright posts 40 whereby the guide rail 44 can be clamped against the workpiece at any height along the lengths of the upright posts 40. Various clamps can be used for this purpose; as illustrated, the clamp comprises an internally threaded nut member 48 which is received over the externally threaded posts 40. One or more lugs 50 can be provided on the threaded member 48 to provide the necessary leverage for forceably securing the guide bar 44 in the assembly.

The assembly is used in the manner illustrated in FIG. 1 by positioning a workpiece 52 on the upper surface of the base plate 12, preferably with one edge engaged against the fence 14, thereby orienting its end 54 in a parallel relationship to the guide rail 44. The workpiece is located with its end 54 at a predetermined distance X from the side of the guide rail and this distance orients the location of the groove such as the rabbet 56 that is formed at the end of the workpiece by movement of a router 58, shown in phantom lines, along the guide rail with its inside edge 60 engaged firmly against the face 62 of the guide rail 44. The exact spacing of the workpiece in the assembly can be precisely controlled by using one of a plurality of guide blanks having predetermined widths for the particular work tool such as router 58 and the diameter of the work bit. In this fashion, workpieces can be quickly and precisely oriented in the device for cutoffs with a saw such as a circular saw, sabre saw etc., or for grooving or rabbeting with a router, as illustrated.

Figure 2:
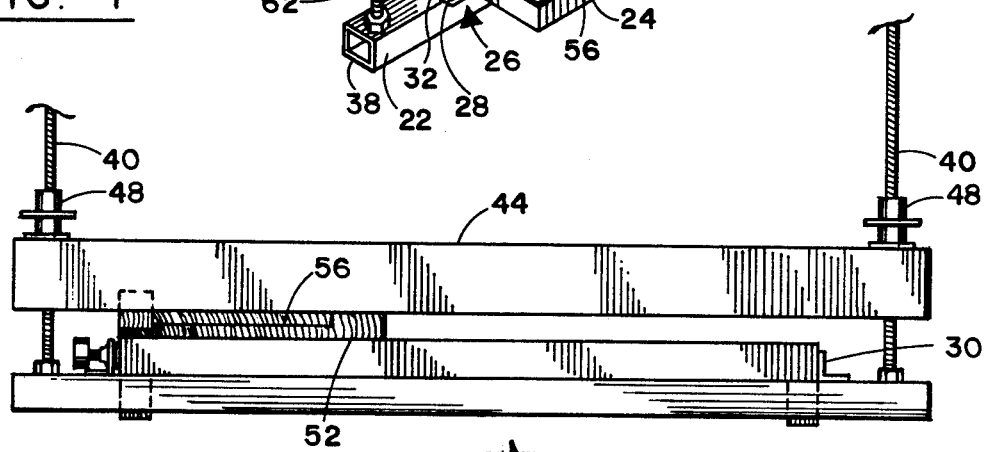
FIG. 2 is a front elevational view of the assembly.

Referring now to FIG. 2, the invention is illustrated in greater detail. As shown in FIG. 2, the base plate 12 has one or more bottom rails 64 which extend across the bottom surface and which support the base plate or which can be used for securing the assembly in a suitable vise or stand such as the "WORKMATE", all purpose work center and vise manufactured and sold by the Black and Decker Manufacturing Company of Towson, Md. Alternatively, a plurality of support legs could also be positioned on the undersurface of the base plate 12 for supporting the assembly.

The small transverse flanges 28 and 30 are shown secured permanently to the crossbar 22, preferably by welding. The flange 28 has apertures which receive lead screws such as 34 that are threadably engaged to fixedly secure the crossbar and the clamping assembly to the base plate 12. The workpiece 52 is clamped to the base plate 12 by the clamping and guide bar 44 and this member is secured in this clamping relationship by the threaded members 48 on the first and second rods 40.

Figure 3:
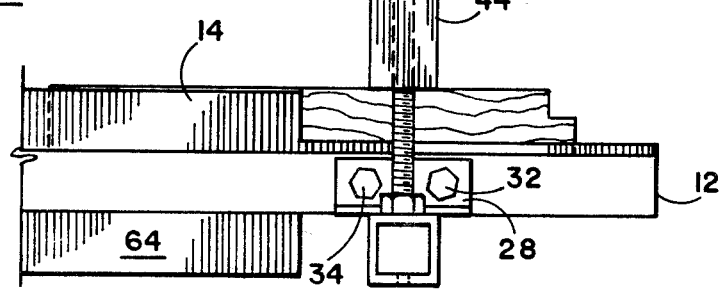
FIG. 3 is a side elevational view of the assembly.

As shown in FIG. 3, the fence 14 extends along substantially the length of the base plate 12 but terminates short thereof, leaving a portion 70 at the forward end of the base plate 12 onto which can be mounted the clamping and guiding assembly generally designated as 20.

The clamping and guide assembly of the invention can be used with a plurality of hand tools without requiring any set up time to assemble or disassemble the tools with a movable slider or sled. The assembly can very precisely locate and orient the workpieces, using the fence for this purpose. Perpendicular cuts and grooves can be produced simply by placing the workpiece against the fence in the illustrated manner. Angular cuts and grooves can be similarly obtained, simply by positioning a triangle or other angular guide between the fence and the edge of the workpiece. The precise distance to the cut or groove can be quickly and simply determined by utilization of one or more of the guides 72 which are flat boards of a precise width X that will locate the inside edge of the cut or groove 56 to the outside face of the guide rail 44.

The assembly as thus described can be used for substantially all cutoff, dadoing and rabbeting work in a workshop. The device can accommodate large bulky objects, being only limited in this regard by the vertical height of the distal posts 40. Vertical posts 40 can have a length from 10 to 100 percent of the width of base plate 12, preferably from about 25 to 75 percent of this width, and this length will accommodate most workpieces. If desired, these posts can be provided in preselected sets of varied lengths which can be interchangeably secured to the crossbar 22, thereby providing any desired length, up to two or three times the width of base plate 12. This can be simply effected by providing internally threaded bores in the ends of the crossbar 22 that will removably receive the threaded ends of the vertical posts 40.

The clamping end guide assembly can be used with any of a variety of hand tools and a number of functions can be performed on a single workpiece without disassembly or removing the workpiece from the clamping assembly. Thus the workpiece 52 shown in FIG. 1 can be cut to a predetermined length, using a hand circular saw guided against the outside face of the clamp rail 44 and thereafter a rabbet or dado can be cut in the workpiece in the manner illustrated in FIG. 1. This operations can be accomplished simply by putting down one tool and picking up the next tool, and repositioning the workpiece between operations, if necessary.

Since the clamping assembly is substantially symmetrical, there is complete freedom of access from either side of the device and the device can thus be used from either side, accommodating left and right-handed users.

Finally, the device also can serve as a clamp for securing one or more workpieces together during gluing operations. It can be used for the precise aligning of a plurality of boards when edge gluing these boards into a single large surface, utilizing, for this purpose, bar or pipe clamps to compress the glue joints.

The invention has been described with reference to the particularly illustrated and presently preferred embodiment. It is not intended that the invention be unduly limited by this disclosure of the presently preferred embodiment. Instead, it is intended that the invention be defined by the means, and their obvious equivalents, set forth in the following claims.

What is claimed is:

1. A work clamp and tool guide assembly with a base plate which comprises:
    (a) a base plate;
    (b) a crossbar having distal vise means to secure said crossbar to the undersurface of said base plate at the forward edge of said base plate;
    (c) first and second upright posts, one each located and fixedly secured at an opposite end of said crossbar;
    (d) a guide rail having a substantially greater depth than width, a smooth, unbroken vertical guide surface, and a smooth, unbroken clamping undersurface, and coextensive with said crossbar with distal, transverse through bores slideably received over said first and second upright posts;
    (e) guide rail locking means operatively engaging each of said posts to fixedly secure said guide rail at adjustable positions thereon, and
    (f) a fence fixedly secured to said base plate and extending along one edge of said work piece orthogonal to and rearward of said clamp and tool guide assembly.

2. The assembly of claim 1 wherein said vise means comprises first and second flanges, one each, mounted transversely of said crossbar, at opposite ends of said crossbar, and screw clamp means threadably received in one of said flanges whereby said crossbar can be secured to said base plate.

3. The assembly of claim 1 wherein said crossbar is secured to said base plate orthogonally to said fence.

4. The assembly of claim 1 wherein said base plate has at least one dependent rail on its undersurface.

5. The assembly of claim 3 wherein one said rail is centrally located on the undersurface of said base plate.

* * * * *